…

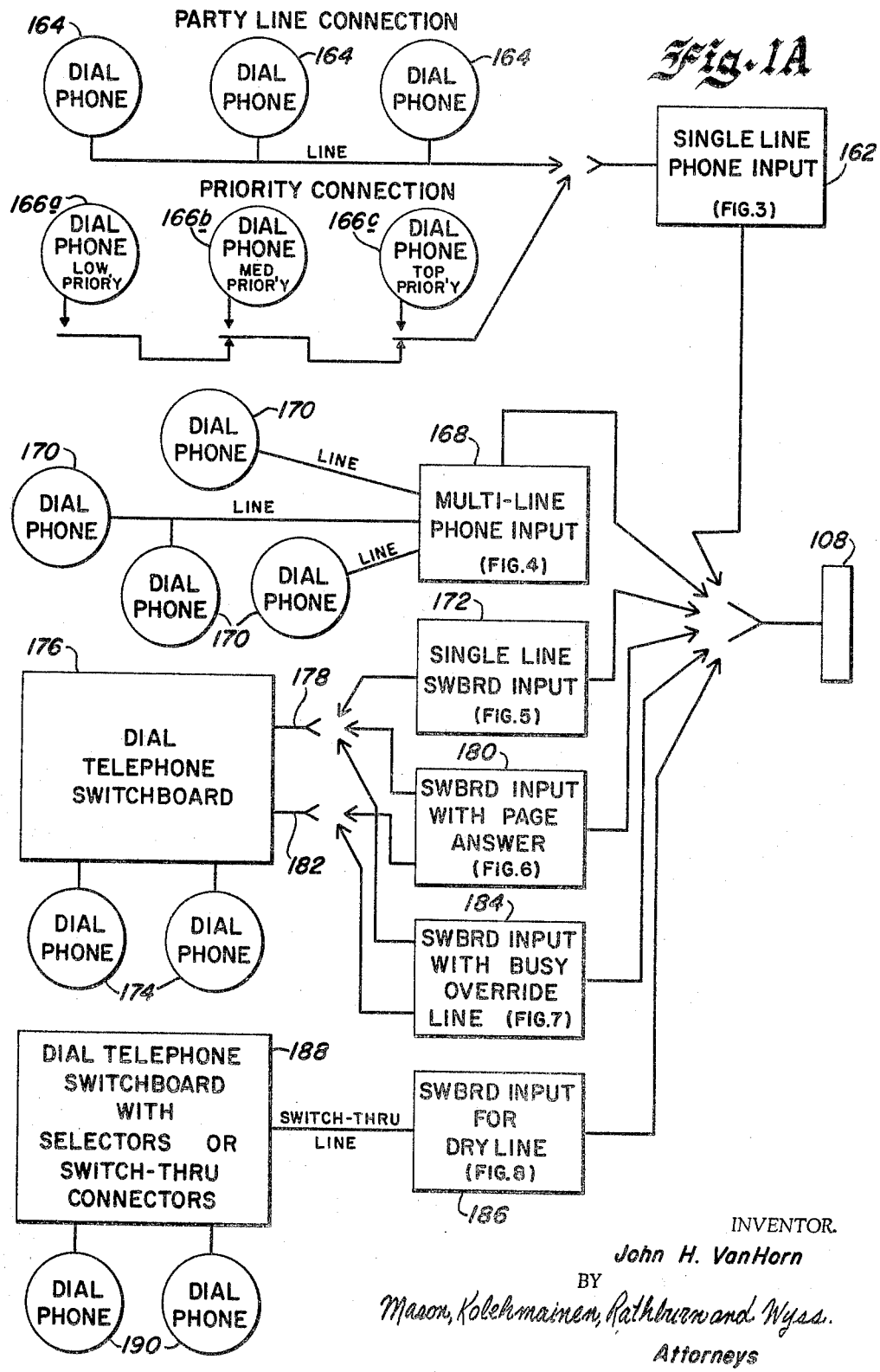

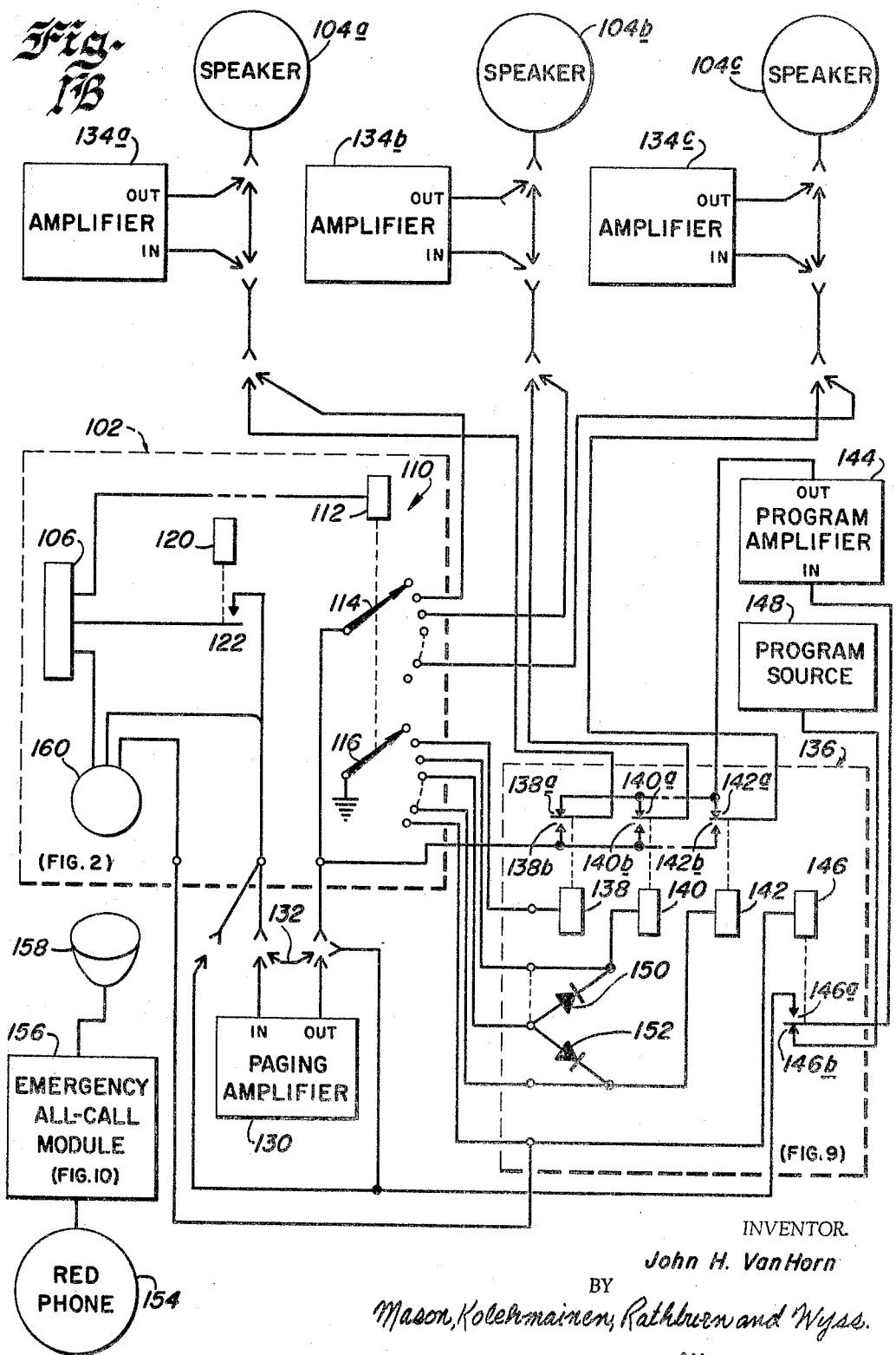

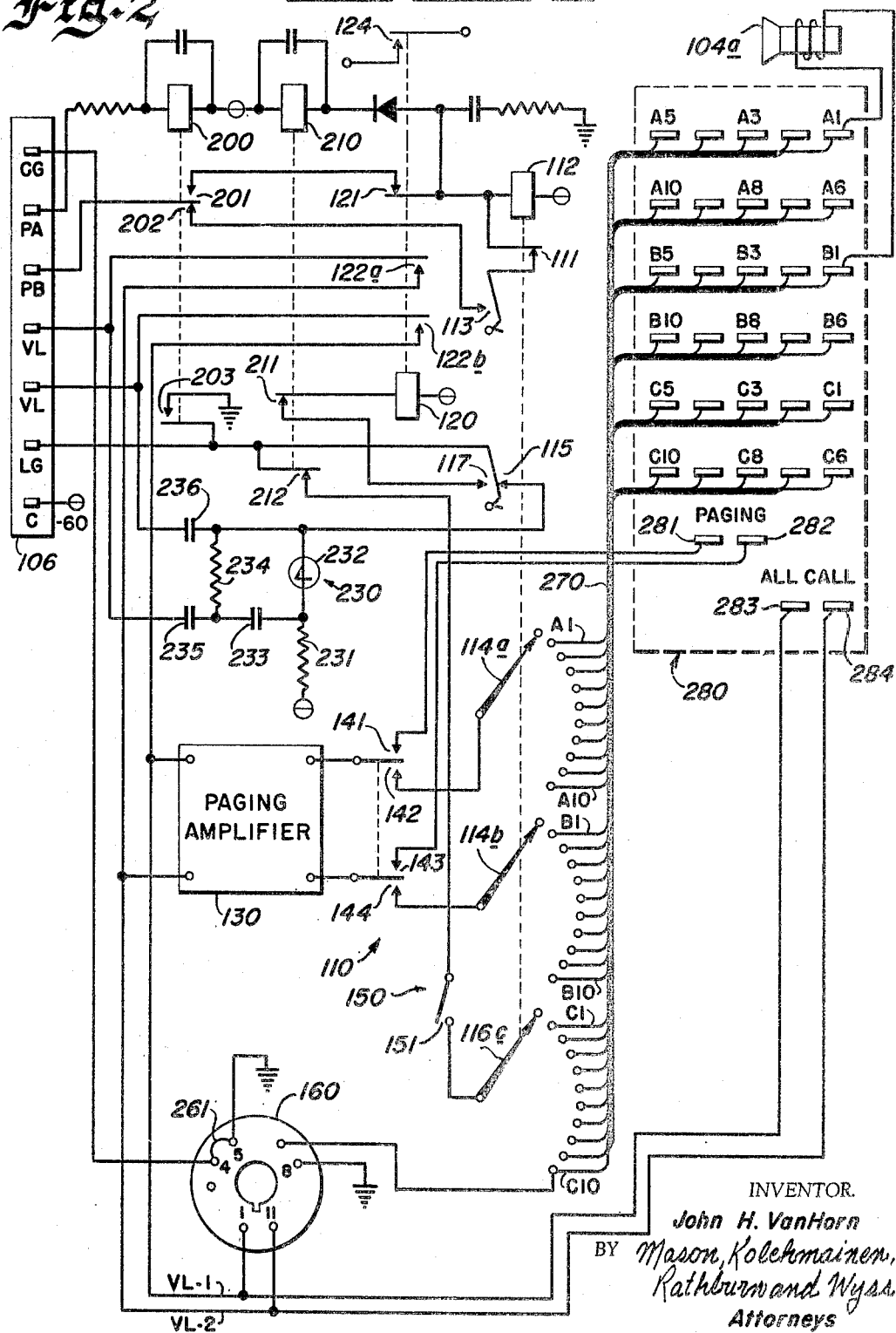

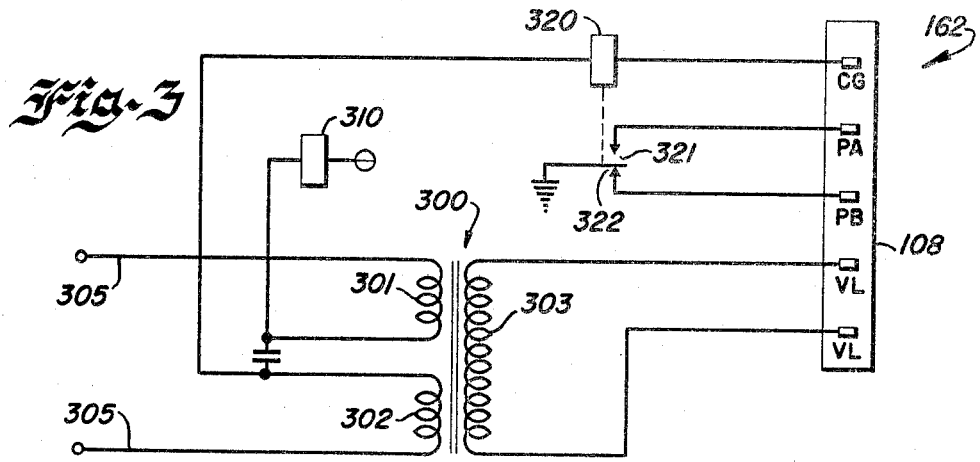
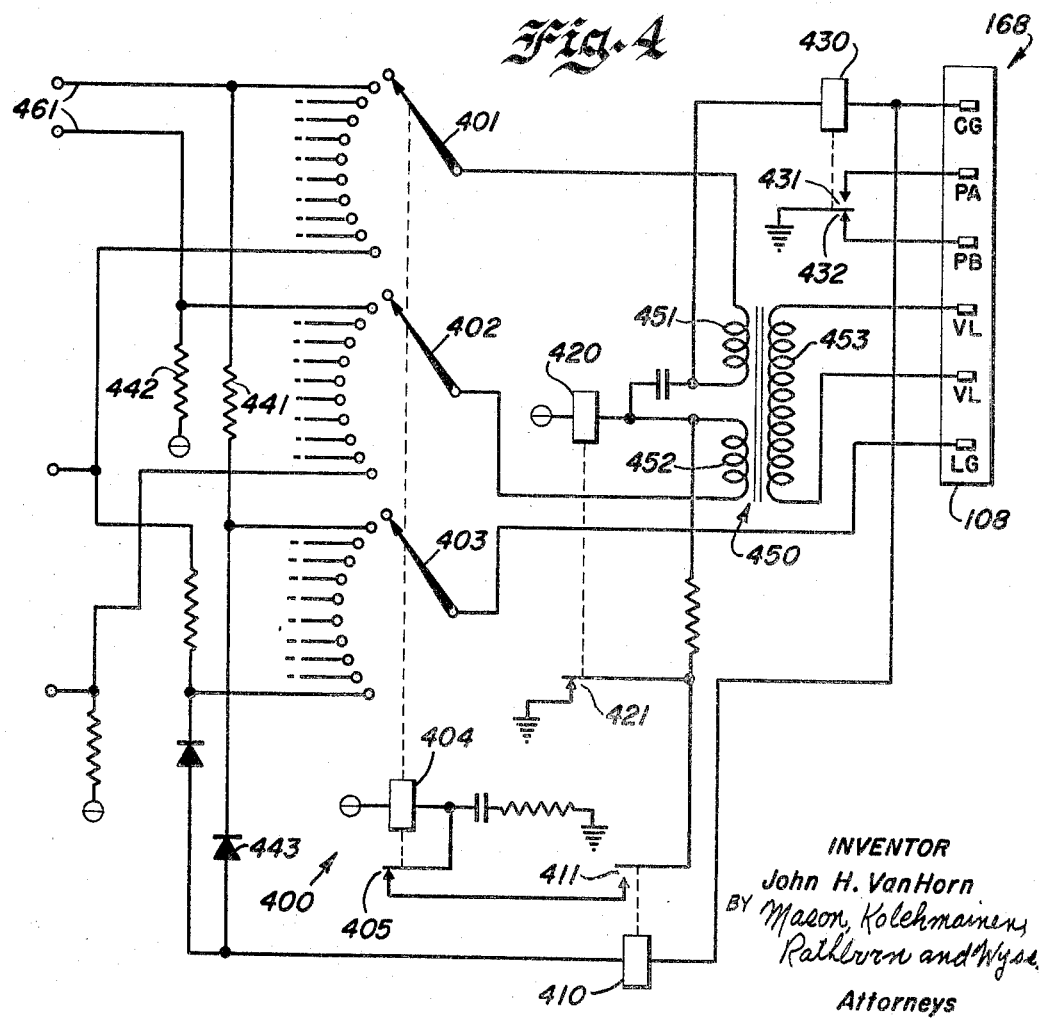

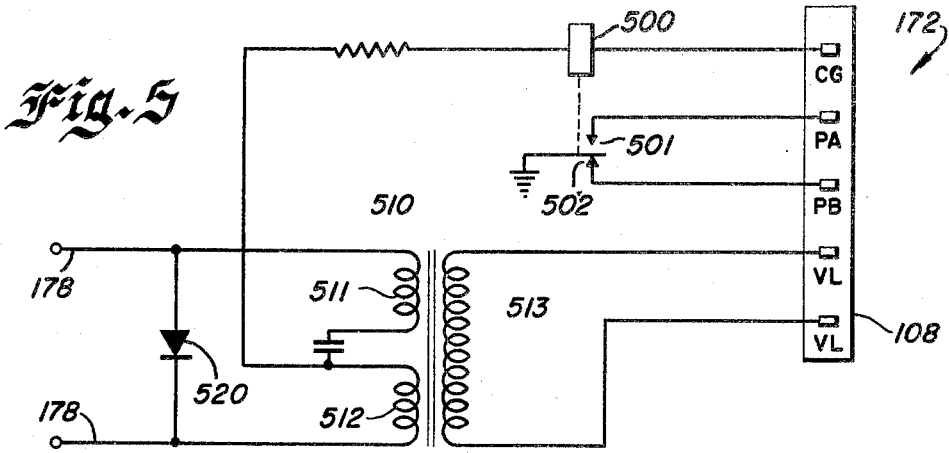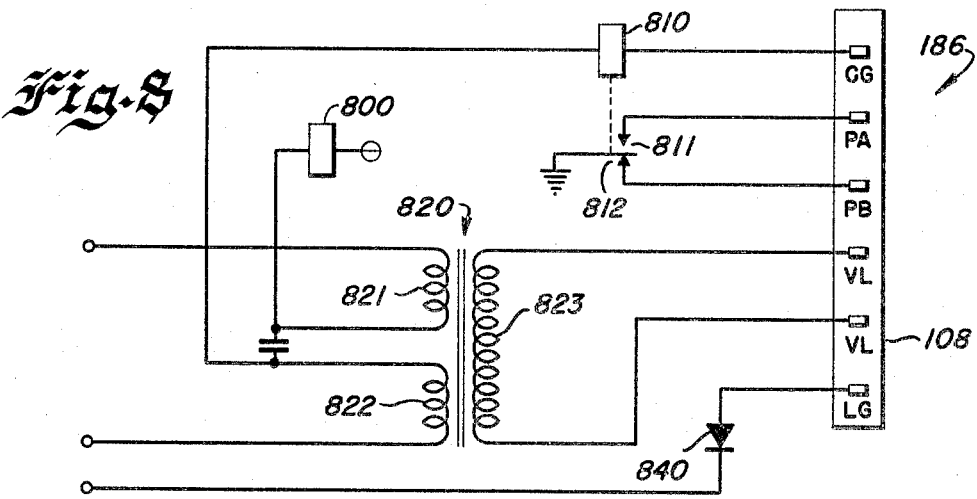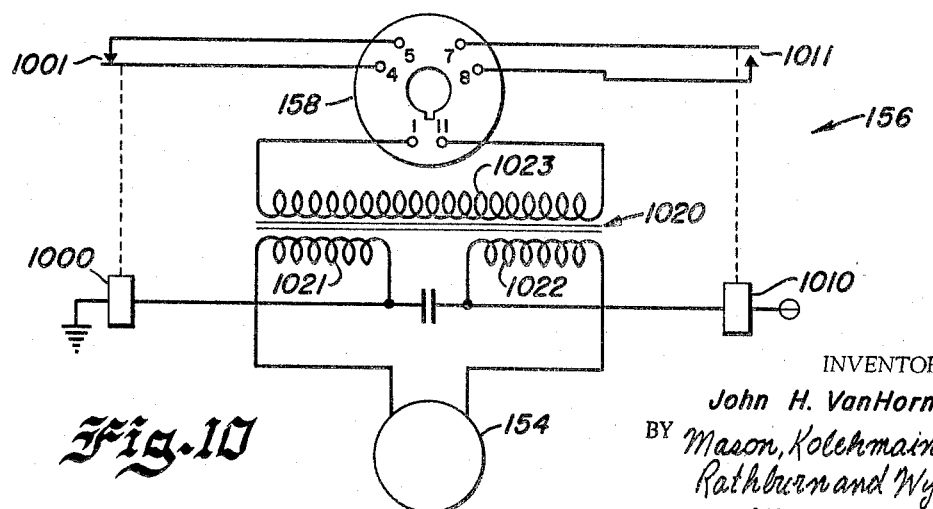

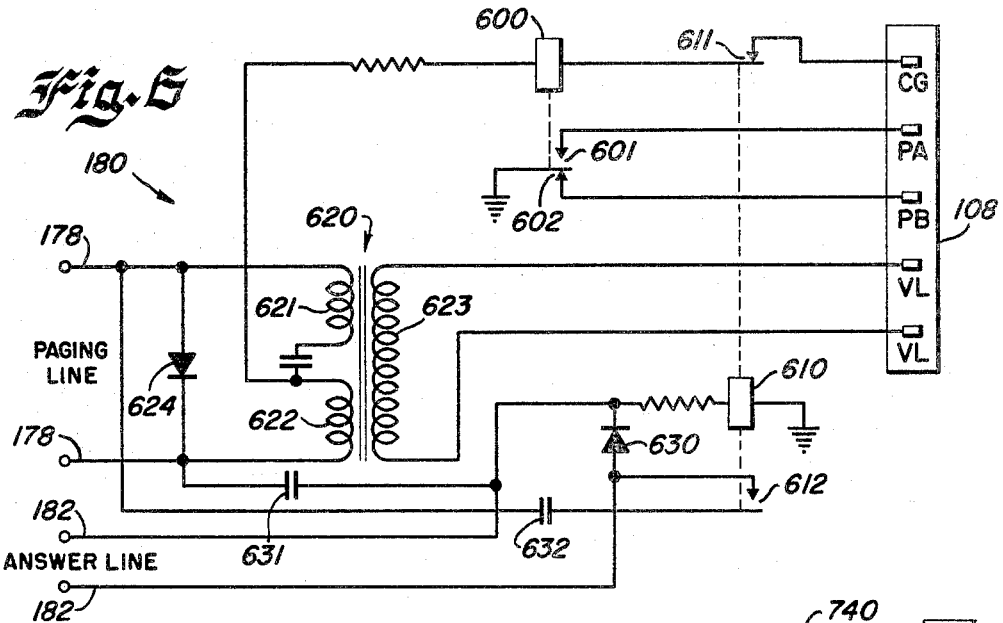
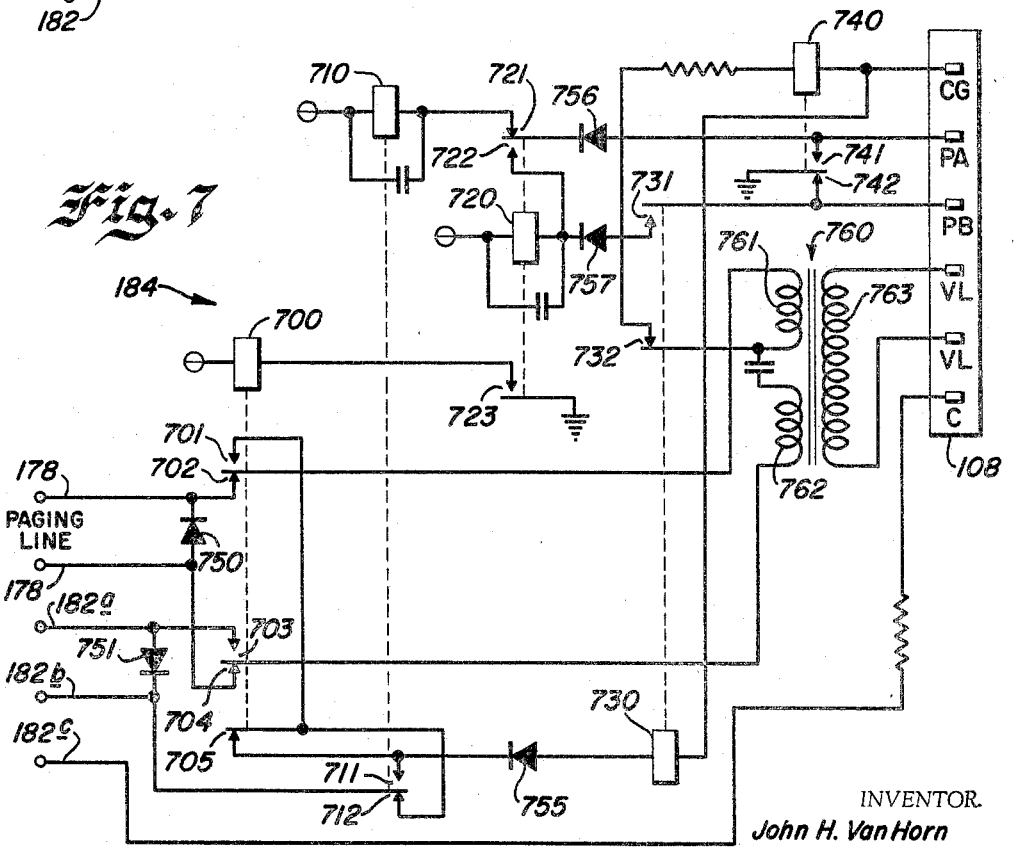

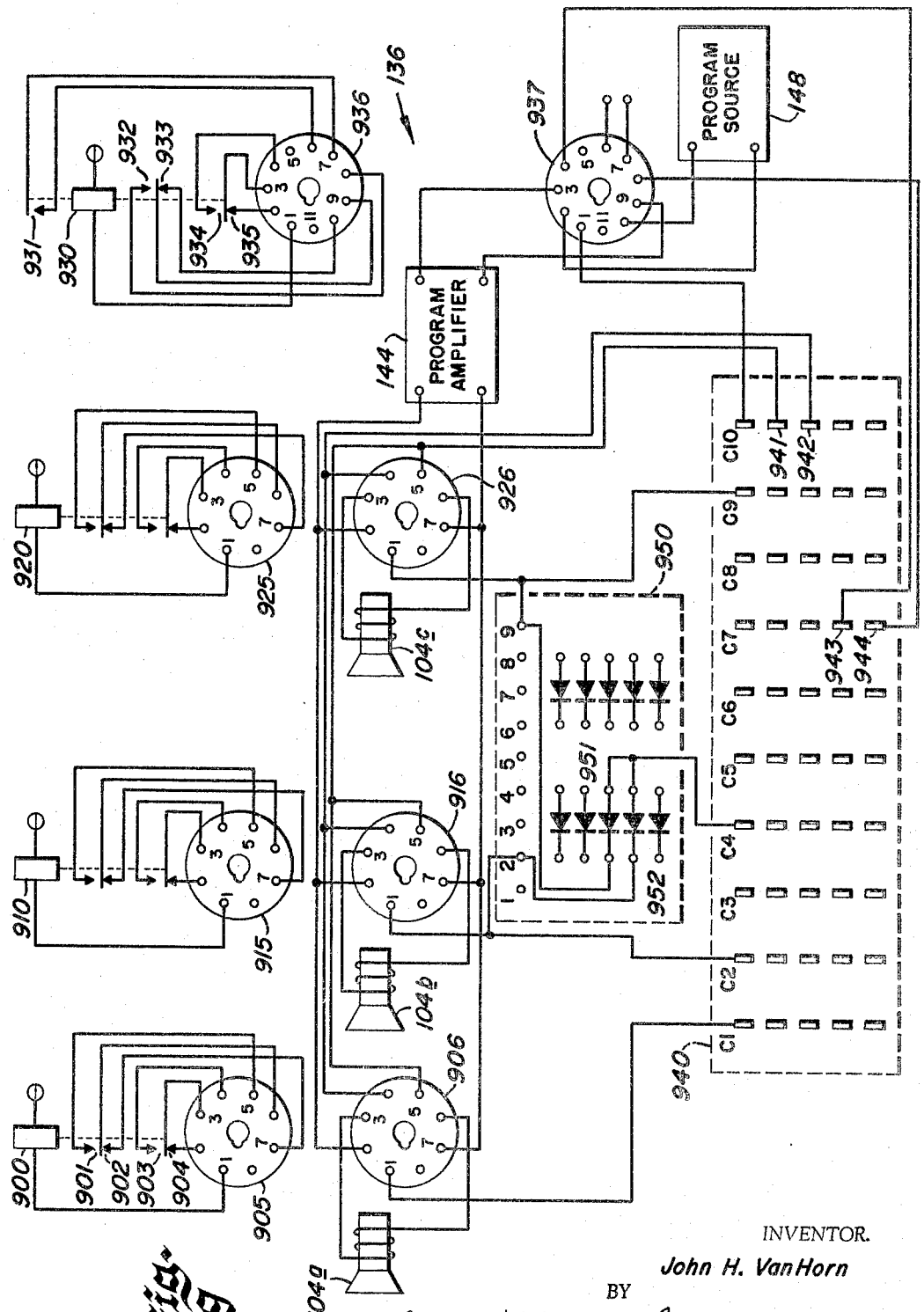

3,267,219
PAGING SYSTEM
John H. Van Horn, Racine, Wis., assignor to Webster Electric Company, Racine, Wis., a corporation of Delaware
Filed Feb. 25, 1963, Ser. No. 260,690
8 Claims. (Cl. 179—18)

This invention relates to a paging system and, more particularly to a dial controlled paging system.

In paging systems used in large buildings or factories, it is necessary to provide a relatively large number of speakers in widely separated areas to insure adequate coverage of the building or installation. Since most personnel can be reached by an oral announcement in a relatively small number of all of the total paging areas provided, the interruptions sometimes resulting from paging can be considerably reduced by directing each paging announcement to only the selected area or areas in which the desired person is likely to be located. However, a selective system of this type should also be capable of reaching all of the separate paging areas when, for instance, announcements of an emergency nature are to be made. In addition, it would be desirable to provide a selective paging system of this type that is flexible enough to permit its use with varying types of communication and telephone equipment without requiring an appreciable amount of circuit change or modification for each installation. This compatibility with existing equipment also reduces the cost of the installation by permitting existing telephone or intercommunication equipment to be used as much as possible.

Accordingly, one object of the present invention is to provide a new and improved paging system.

Another object is to provide a paging system in which a paging announcement can be selectively directed to all or less than all of the number of separate paging areas.

Another object is to provide a paging system including dial controlled means for selectively directing communications to different paging areas.

Another object is to provide a paging system including both means for paging selected areas and other means for disabling the selective means and for concurrently directing communications to all of the paging areas.

Another object is to provide a selective paging system including new and improved means for transmitting paging announcements to different combinations of paging areas.

Another object is to provide a modular paging system including a common control unit which is easily adapted for use with different types of input and output equipment by a plurality of detachably mounted module units.

Another object is to provide a paging system including a common circuit conditioned to provide various types of service by the use of different ones of a number of modules that are detachably connected to the common control circuit.

In accordance with these and many other objects, an embodiment of the invention comprises a dial controlled paging system having a central control unit and a plurality of spaced paging or speaker areas including loudspeakers. The central control unit is modified to work with and is supplied with an input from one of a number of different types of existing telephone lines or switchboards by a plurality of different input modules which terminate the incoming line and provide means for extending voice signals and dial pulses received from the incoming line to the common control unit. The common control unit includes a selector means operated by the received dial pulses to select the desired ones of the speaker areas and additional means for extending the incoming voice path to the selected speaker area. In one form, the voice paths are extended directly to the speaker areas in response to the setting of the selector means. In another form, an output module connected to the central control unit is controlled by the setting of the selector to control a matrix or translation network to permit various combinations of speaker areas to be concurrently selected.

It is frequently desirable to be able to concurrently transmit announcements, such as those of an emergency nature, to all of the speaker areas. Accordingly, an additional control module is provided for detachable connection to the central control unit. This module, when operated, disables the selecting means and releases any existing paging input to permit the concurrent transmission of an announcement to all of the paging or speaker areas.

Many other objects and embodiments of the present invention will become apparent from considering the following detailed description in conjunction with the drawings, in which:

FIGS. 1a and 1b are block diagrams of a dial controlled paging system embodying the present invention;

FIG. 2 is a schematic circuit diagram of a common control unit in the system;

FIG. 3 is a schematic circuit diagram of an input module for a single line input;

FIG. 4 is a schematic circuit diagram of a module for a group of input lines;

FIG. 5 is a schematic circuit diagram of a module for connecting the common control circuit to an input line from a switchboard;

FIG. 6 is a schematic circuit diagram of a module for conditioning the common control to provide page answering service with an input line from a switchboard;

FIG. 7 is a schematic circuit diagram of a module for providing normal paging service to a connected switchboard in conjunction with a busy override service;

FIG. 8 is a schematic circuit diagram of a module for connecting the common control unit with a "dry" line;

FIG. 9 is a schematic circuit diagram of an area grouping output module; and

FIG. 10 is a schematic circuit diagram of a module for conditioning the common control unit for emergency paging operations.

Referring now more specifically to FIG. 1 of the drawings, therein is illustrated a dial controlled paging system which is indicated generally as 100 and which embodies the present invention. The system 100 includes a central or common control unit 102 for selectively extending paging connections from any one of a plurality of input sources (FIG. 1A) to one, a combination, or all of a plurality of loudspeakers 104a–c (FIG. 1B) in different speaker areas. Each of the illustrated speakers 104a–c can represent a number of similar speakers in the paging area. The common control unit 102 includes an input module socket or connector 106 that is detachably connected to any one of a plurality of input modules terminating different types of input signal sources by an input module plug or connector 108. The input socket 106 supplies dial pulses to a stepping switch 110 including both a motor magnet 112 energized by the input pulses and a plurality of wipers 114 and 116. The train of input pulses representing the value of the digit identifying the speaker or speakers 104a–c to be connected to the paging signal source is applied to the motor magnet 112 of the stepping switch 110 to advance the wipers 114 and 116 thereof to a position corresponding to the value of the input digit. When the stepping switch has been set, a switch-through relay 120 is operated to close a pair of normally open contacts 122 to connect the voice path from the input socket 106 to the selected speaker or speakers 104a–c.

In one form, the voice path extends from the closed contacts 122 through a common paging amplifier 130 and over the wiper 114 directly to the single selected one of the speakers 104a–c. Alternatively, by the use of a jumper 132, the voice path can be extended from the closed contacts 122 through the jumper 132 and the wiper 114 to the selected one of the speakers 104a–c through a corresponding one of a plurality of amplifiers 134a–c, each of which is individual to a corresponding one of the speakers 104a–c.

The output from the common control unit 102 can be provided in a different form by the use of a detachably connected output module 136. The module 136 is controlled by the stepping switch 110 to permit the selection of different individual ones or combinations of the speakers 104a–c as well as the selective emergency concurrent calling of all of the speaker areas. The use of the module 136 also facilitates the normal transmission of program material to all of the speaker areas when paging announcements are not being made. More specifically, the module 136 includes a number of transfer relays 138, 140 and 142 equal to the number of speakers 104a–c and having a plurality of normally closed contacts 138a, 140a and 142a normally connecting the output of a program amplifier 144 to the individual speakers 104a–c. The input of the program amplifier 144 is normally connected through a pair of closed contacts 146a on an all-call relay 146 in the module 136 to a source 148 of program material. Thus, all of the speakers 104a–c normally receive program material from the source 148 through the amplifier 144.

However, when the common control units 102 receive an input from one of the paging signal sources and the stepping switch 110 is set to a position in accordance with the value of the received digit, the wiper 116 thereof forwards an operating signal to a selected one of the relays 138, 140, 142, and 146. If, for instance, the page is to be directed to speaker area 1 in which the speaker 104a is located, the stepping switch 110 is adjusted to its first position, and the relay 138 is operated to open the contacts 138a and to close a pair of contacts 138b. The opening of the contacts 138a interrupts the transmission of the program material to the speaker 104a, and the closure of the contacts 138b connects the speaker to the output of the paging amplifier 130 so that when the switch-through contacts 122 are closed, the page is directed to the speaker 104a, the remaining speakers 104b and 104c continuing to receive the program material. In a similar manner, adjustment of the stepping switch 110 to its second or ninth positions, for instance, would cause the operation of the relays 140 or 142.

The module 136 also permits various of the speaker areas to be grouped and collectively connected to the output of the paging amplifier 130 when certain digital values are transmitted to the central control module 102. As an example, if the stepping switch 110 is advanced to its third position, for instance, the contact engaged by this wiper is connected through a pair of diodes 150 and 152 to the windings of the relays 140 and 142 to cause their operation so that both of the speakers 104b and 104c receive the paging announcement.

The module 136 also permits the system 100 to provide an all-call operation. One of the positions of the stepping switch 110 is assigned to this function so that when the wiper 110 is advanced, for instance, to its tenth position, the all-call relay 146 is operated to open the contacts 146b and to close a pair of contacts 146a. This connects the input of the program amplifier 144 to the voice path at the contacts 122 through the paging amplifier 130. Thus, when the contacts 122 are closed, the paging announcement is directed through the amplifiers 130 and 144 and through the closed contacts 138a, 140a and 142a to all of the speakers 104a–c.

The common control unit 102 can also be provided with a separate module with a direct input for providing an emergency all-call operation. If this feature is desired, a separate emergency or "red" phone or handset 154 is provided connected to an emergency all-call module 156. This module is connected to the common control 102 through a detachable plug 158 and a socket 160. When the phone 154 is placed in a calling or off-hook condition, the module 156 removes a control ground which is forwarded through the socket 106 and the plug 108 to the normal input so as to disable all inputs to the common control circuit 102 and to release the components in this circuit, such as the stepping switch 110 and the switch-through relay 120, to a normal condition. The module 156 also extends the voice path from the station 154 to the normally open contacts 146a on the all-call relay 146, either directly or through the paging amplifier 130, and applies an operating signal to the relay 146 so that it operates to close the contacts 146a. Thus, the handset 154 is connected through the program amplifier and the closed contacts 138a, 140a, and 142a to all of the speakers 104a–c to permit the concurrent transmission of the emergency announcement to all of the speaker areas.

As indicated above, the common control unit 102 is adapted for operation with a plurality of different types of paging signal sources under the control of a number of different input modules which are connected to the input module socket 106 by the plug 108. A module 162 provides means for interconnecting the common control 102 with a single telephone line to which one or a plurality of conventional dial telephones can be connected. FIGURE 1A of the drawings illustrates a plurality of stations or telephones 164 on a party line that is terminated in the module 162. This module can also provide service to a plurality of conventional telephone subsets 166a–c which are connected to a line in a priority arrangement. In the illustrated arrangement, the right-hand station 166c has the highest priority and seizes the single line terminating in the unit 162 regardless of the presence of calling conditions at any of the stations 166a and 166b. In general, the module 162 includes means for terminating the telephone line and for extending a voice channel to the common control unit 102. In addition, the module 162 includes pulse forming means operated by the completion of the seizure circuit for repeated dial impulses to the common control 102 for controlling the stepping switch 110.

A plural input module 168 can also be connected to the common control 102. The module 168 provides a suitable termination for a plurality of private or party lines extending to conventional telephone subsets 170. The module 168 includes finder means for seizing a calling one of the plurality of lines and additional means for suitably terminating the seized line and extending dial pulsing and voice communication paths to the common control 102.

A control module 172 prepares the common control unit 102 for extending paging service to a plurality of stations 174 served by an automatic telephone switchboard 176. A single line from the switchboard 176, such as a line 178, is assigned to the paging system 100 and is terminated in the control module 172. This module provides means for terminating the line 178 from the switchboard 176 and means for extending voice and dialing paths to the common control unit 102.

A second module 180 can also be used to provide a different type of paging service to the stations 174 served by the switchboard 176. The module 180 operates in substantially the same manner as the module 172 to extend a voice path from the paging line 178 to a selected one, group, or all of the speaker areas served by the system 100. However, the module 180 is connected to a second line 182 from the switchboard 176 which provides a page answering service. When the called party desires to answer the page, the designation of the line 182 is dialed into the switchboard 176 to extend a voice path to the module 180. In response to the extension of a voice path over the line 182 to the module 180, this module interconnects the lines 178 and 182 for voice communication so that the paging party can directly converse with the paged party.

A third module 184 can be used with the switchboard 176 to provide a priority or override paging arrangement. Paging announcements from the stations 174 are normally forwarded through the switchboard 176 to the line 178 which cooperates with the module 184 to permit the normal transmission of paging announcements to selected ones of the speakers 104a–c. However, when an override paging announcement is to be made, the calling station 174 obtains access to the line 182 which also terminates in the module 184. When a call is received over the line 182, the module 184 releases any previously extended voice paths and places the common control 102 under the control of the station connected to the busy override line 182. The module 184 provides the usual functions of terminating the lines 178 and 182 and of forwarding voice communication and pulsing paths to the common control unit 102.

An additional module 186 is used to condition the common control unit 102 for use with a switch-through line connected to a switchboard 188 using either selectors or switch-through connectors. The functions performed by the module 186 are substantially the same as those provided by the module 172 except that the common control circuit 102 and the module 186 return a holding ground to the switchboard 188 to maintain the connection extended to a calling station 190 served by this switchboard.

Referring now more specifically to the details of the paging system 100, the common control circuit 102 is shown in FIG. 2 of the drawings. The circuit 102 is provided with input signals from and supplies control signals to the external modules 162, 168, 172, 180, 184 and 186 through the connectors 106 and 108. When the plug 108 on one of these modules is detachably connected to the socket 106, a main control ground from the common control circuit 102 is forwarded over a jumper 161 in the socket 160 to a terminal CG in the socket 106 and then over the plug 108 to the input module. When a call is extended to one of these modules, an operating circuit is completed over a terminal PA for a relay 200 which operates to close a plurality of contacts 201 and 203 and to open a pair of contacts 202. The closure of the contacts 201 prepares an operating circuit for a relay 210 and the motor magnet 112, and the operation of the contacts 202 interrupts a circuit for homing the stepping switch 110. The closure of the contacts 203 applies a holding ground to a terminal LG in the socket 106. The ground from the contacts 203 is also forwarded through a pair of closed off-normal contacts 115 on the stepping switch 110 to place a tone generator 230 in operation to return dial tone to the calling station indicating that the paging system 100 is available for use and that the dialing of the paging area selection digit can be initiated.

The tone generator 230 includes a breakover diode 232 connected in parallel with a capacitance 233 and a resistance element 234. One terminal of the breakover diode 232 is connected to ground at the closed contacts 115, and the other terminal of this diode is connected to grounded battery through a resistance 231. When ground is applied to the breakover diode 232, the periodic charging and discharging of the capacitance 233 produces a tone which is forwarded through a pair of coupling capacitors 235 and 236 to a pair of terminals VL in the socket 106. These two terminals are connected to the voice path in the input module. Thus, the dial tone supplied by the generator 230 is returned to the calling station to indicate that the dialing operation can be initiated.

During dialing, ground is momentarily removed from the terminal PA and applied to a terminal PB during each dial impulse. Accordingly, when the first dial impulse is received from the input module, the operating circuit for the relay 200 is interrupted. However, this relay is slow-to-release because of a capacitor shunting its operating winding and does not release in the impulse interval. The ground applied to the terminal PB is forwarded through the closed contacts 201, a pair of normally closed contacts 121, and diode 213 to operate a relay 210 to open a plurality of contacts 211 and 212. The ground pulse supplied to the terminal PB is also applied to the operating winding of the motor magnet 112 of the stepping switch 110.

When the ground pulse at the terminal PB is removed and ground is reapplied to the terminal PA, the operating circuit for the relay 200 is again completed, and the operating circuits for the relay 210 and the motor magnet 112 are interrupted. However, the relay 210 is slow-to-release because of the capacitor shunting its operating winding and does not release at this time. When the motor magnet 112 releases, the wipers 114a, 114b and 116 of the stepping switch 110 are advanced a single step. The first step of the switch 110 actuates a plurality of off-normal contacts to close a group of contacts 113 and 117 and to open the contacts 115. The opening of the contacts 115 removes ground from the breakover diode 132 to disable the tone generator 130 so that a dial tone is no longer returned to the calling station.

The relays 200 and 210 and the motor magnet 112 of the stepping switch 110 operate in the manner described above to advance the wipers 114a, 114b and 116 to a setting representing the value of the selection digit received through the input module from the calling station or telephone subset. In the interval following the dialing of the digit, ground is removed from the terminal PB and is continuously applied to the terminal PA. This maintains the relay 200 in an operated condition and permits the relay 210 to time out so that it releases to close the contacts 211 and 212.

The closure of the contacts 211 completes an operating circuit for the switch-through relay 120 extending from ground at the closed contacts 203 through the closed contacts 117 and 211. When the relay 120 operates, the contacts 121 are opened to interrupt the operating circuits for the motor magnet 112 and the relay 210 and a plurality of contacts 122a, 122b, and 124 are closed. The closure of the contacts 124 can be used to perform any number of desired auxiliary services. As an example, the closure of the contacts 124 can be used to control the application of B+ potential to the paging amplifier 130.

The closure of the contacts 122a and 122b connects the voice path terminals VL to an output path extending to the speaker areas. If, as an example, the module 136 is not used and the common paging amplifier 130 rather than the individual amplifiers 134a–c are to be used, the voice signals provided at the closed contacts 122a and 122b are applied to the input of the paging amplifier 130. A switching means 140 connected to the output of the paging amplifier 130 is actuated to close a plurality of contacts 142 and 144 so that the output of the paging amplifier 130 is connected to the wipers 114a and 114b of the stepping switch 110. The output conductors from the three banks of switch 110 are connected to a plurality of terminals in a socket over a cable 270. Thus, assuming that the stepping switch 110 has been advanced only a single step, the output of the paging amplifier 130 is connected through the closed contacts 142 and 144, the wipers 114a and 114b, and two conductors in the cable 270 to the winding of the speaker 104a in the first speaker area. The calling party can now page in the first speaker area. If the individual amplifiers 134a–c are to be used, the path for directing signals to the speaker 104a is the same except that the jumpers 132 connect the contacts 122a and 122b directly to the wipers 114a and 114b.

Alternatively, if the common control 102 is to be used with the module 136, the speakers 104a–c are not connected over the socket 280 to the banks of the switch 110 associated with the wipers 114a and 114b but are connected to the output terminals of the module 136. To condition the common control 102 for operation with the module 136, the switch 140 is actuated to open the contacts 142 and 144 and to close a plurality of contacts 141 and 143. A switch 150 is also operated to close a pair of normally open contacts 151. The closure of contacts 141 and 143 connects the output of the paging amplifier 130 to a pair of paging output terminals 281 and 282 in the socket 280 to permit the voice signals received from the calling station to be transferred to the module 136. Thus, the output of the paging amplifier 130 is no longer forwarded to the wipers 114a and 114b of the stepping switch 110. The closure of the contacts 151 connects the wiper 116 of the stepping switch 110 to the contacts 212. These contacts are closed at the end of the dialing operation so that ground from the closed contacts 203 is applied to the wiper 116. Since this wiper engages a contact in the bank associated therewith representing the value of the input digit, a selected one of ten conductors in the cable 270 individual to this contact is supplied with a control signal representing the value of the selection digit. This control signal is selectively forwarded to the control module 136 by a connection with the socket 280.

When the calling station returns to a normal condition at the termination of the paging announcement, ground is removed from the terminal PA by the input module and is applied to the terminal PB. The removal of the ground from the terminal PA releases the relay 200 so the contacts 201 and 203 are opened and the contacts 202 are closed. The opening of the contacts 203 removes ground from the wiper 116, in the instance in which the common control 102 is used with the module 136, to restore this module to a normal condition. The opening of the contacts 203 also interrupts the operating circuit for the relay 120 so that this relay releases to close the contacts 121 and to open the contacts 122a, 122b and 124. The opening of the contacts 122a and 122b interrupts the connection between the voice channel input terminals VL and either the input to the paging amplifier 130 or the module 136. The other contact operations merely aid in restoring the circuit 102 to its normal condition.

The opening of the contacts 201 interrupts an additional point in the operating circuit for the motor magnet 112 and the relay 210, and the closure of the contacts 202 forwards the ground provided at the terminal PB through the closed off-normal contacts 113 and a pair of interrupter contacts 111 on the motor magnet 112 to energize the motor magnet 112. When the motor magnet 112 and the relay 210, and the closure of the contacts opened to interrupt the operating circuit for the magnet 112. Thus, the stepping switch 110 is stepped to its normal home position under the control of the contacts 111. When the switch 110 reaches its normal home position, the off-normal contacts 113 and 117 are opened and the contacts 115 are closed. This restores the common control circuit 102 to its normal condition.

The module 162 for interconnecting the common control circuit 102 with a single telephone line input is illustrated in FIG. 3 of the drawings. This circuit includes the module plug 108 provided with terminals corresponding to the like identified terminals on the input socket 106 in the common control circuit 102. An incoming telephone line is connected to a pair of input terminals 305 so that when one of the stations is placed in a calling condition by going off-hook, an operating circuit for a relay 320 is completed extending from ground at the terminal CG through the winding of the relay 320, one primary winding 302 of a line transformer 300, the telephone subset, a second primary winding 301 of the line transformer 300, and then to grounded battery through a line balancing impedance 310. The completion of this circuit operates the relay 320 to close a pair of contacts 321 and to open a pair of contacts 322. The opening of the contacts 322 removes ground from the terminal PB, and the closure of the contacts 321 applies ground to the terminal PA. This causes the seizure of the common control circuit 102 in the manner described above so that dial tone is returned to the terminals VL and applied to a secondary winding 303 of the line transformer 300. This is coupled over the telephone line to the calling subscriber to provide an indication that the dialing of the selection digit can be initiated.

When the dialing device at the calling station is operated, the above-identified operating circuit for the relay 320 is momentarily interrupted for each dial pulse so that this relay releases to momentarily open the contacts 321 and close the contacts 322. This provides the dial pulses that are applied to the terminal PB to control the operation of common control circuit 102. The connection between the calling station and the desired one of the speakers 104a–c is completed in the manner described in detail above. At the termination of the call, the calling station is returned to a normal condition to interrupt the operating circuit for the relay 320 so that this relay releases to restore the module 162 to its normal condition.

FIG. 4 of the drawings illustrates the control module 168 which is connected to the input socket 106 of the common control circuit 102 by the input plug 108 and which is adapted to connect a selected one of a plurality of incoming telephone lines to the paging system 100. When one of the stations 170 on the lines terminating in the module 168 is placed in a calling condition, such as the station connected to the uppermost line terminals 461 shown in FIG. 4, a negative potential is forwarded through a resistance 442 over the calling line and through a resistance 441 to bias a diode 443 in its forward direction. The other terminal of the diode 443 is connected to one terminal of the operating winding of the relay 410, and the other terminal of this winding is connected to ground at the terminal CG. This completes an operating circuit for the relay 410 so that it operates to close a pair of contacts 411.

The closure of the contacts 411 forwards ground from a pair of normally closed contacts 421 through a pair of interrupter contacts 405 in a finder switch 400 to the winding of a motor magnet 404 in this switch. This operates the magnet 404 so that the interrupter contacts 405 are opened to terminate the energization of the magnet 404. The release of the motor magnet 404 advances three wipers 401–403 of the finder switch 400 a single step. Since the line to which the calling station 170 is connected occupies the first position of the finder switch 400, ground is applied from the terminal CG through the operating winding of a relay 430, one primary winding 451 of a line transformer 450, the wiper 401, the calling line, the wiper 402, the other primary winding 452 of the transformer 450, to the winding of a relay 420. The completion of this circuit concurrently operates the relays 420 and 430.

In operating, the relay 420 opens the contacts 421 to disable the energizing circuit for the motor magnet 404 of the switch 400. This terminates further operation of the motor magnet 404 and retains the stepping switch 400 in the position individual to the calling line. It also prevents this switch from being operated in the event that calling conditions arise on others of the lines served by the finder switch 400 during the time in which the module 168 is in use extending a connection from the prior calling station 170. The ground potential provided by the wiper 401 is also effective through the resistance 441 to remove the forward bias from the diode 443 so that the relay 410 releases to open the contacts 411.

The operation of the relay 430 closes a pair of contacts 431 and opens a pair of contacts 432. The contacts 431 and 432 are connected to the terminals PA and PB of the plug 108 and provide dial pulses to the common control circuit 102 in the manner described above. The secondary winding 453 of the line transformer 450 is connected to the terminals VL to extend the voice path from the calling party to the common control circuit 102.

As set forth above, the closure of the contacts 431 operates the relay 200 in the common control circuit 102 so that the contacts 203 are closed to ground the terminal LG. This ground is forwarded to the wiper 403 in the finder switch 400 so that a continuous ground is applied to the cathode of the diode 443. This continuous ground maintains the diode 443 in a reverse biased condition during dialing operations.

When the paging operation has been completed and the calling station 170 returns to a normal condition, the operating circuit for the relays 420 and 430 is interrupted so that these relays release. The release of the relay 420 closes the contacts 421 to prepare the finder switch for operation. The release of the relay 430 opens the contacts 431 and closes the contacts 432 to complete the homing circuit for the stepping switch 110 in the common control circuit 102 in the manner described above.

The module 172 for interconnecting the common control circuit 102 with the single output line 178 from the automatic telephone switchboard 176 is illustrated in FIG. 5 of the drawings. The module 172 is connected to the circuit 102 by the plug 108, and the line 178 is connected to two primary windings 511 and 512 of a line transformer 510. When the line 178 is called by the switchboard 176 following the extension of a connection from a calling station 174 to the switchboard 176, a ringing signal or tone is applied to the line 178. A ring-trip diode 520 shunted across the line 178 is placed in a conductive condition by a bias supplied to the line 178 with the ringing signal so that the line 178 appears at the switchboard 176 to have been answered in the module 172. This operates the ring-trip control in the switchboard 176 so that the ringing signal is removed from the line 178, and this line is cut through to the line individual to the calling station 174.

The negative battery now applied to the lower conductor of the line 178 is forwarded through the winding of a relay 500 to ground at the terminal CG so that the relay 500 is operated to open a pair of contacts 502 and to close a pair of contacts 501. This seizes the control circuit 102 in the manner described above. The voice path from a secondary winding 513 of the line transformer 510 is connected to the terminals VL. When the connection from the calling station 174 is terminated, the line 178 is opened and the relay 500 releases to open the contacts 501 and to close the contacts 502. The closure of the contacts 502 is effective to restore the common control circuit 102 in the manner described above.

The control module 180 for providing page answering service in conjunction with the automatic switchboard 176 is illustrated in FIG. 6 of the drawings. The module 180 is connected to the common control circuit by the plug 108 and is connected to the automatic switchboard 176 by the paging line 178 and the answer line 182. The module 180 connects the paging line 178 to a selected one or combination of the speakers 104a–c and directly interconnects this line with the answer line 182 when the page is answered.

When a connection is extended from a paging station 174 through the switchboard 176 to the line, ringing is applied by the switchboard 176 to the line 178 which is effective to bias the diode 624 in a forward direction so that ringing is removed by the switchboard and the line 178 is cut through to the module 180. At this time, negative battery is applied from the one side of the line 178 through one primary winding 622 of a line transformer 620, the winding of a relay 600, and a pair of normally closed contacts 611 to ground of the terminal CG. This operates the relay 600 to open a pair of contacts 602 and to close a pair of contacts 601. This seizes the common control 102 so that dial tone is returned over the terminals VL and a secondary winding 623 on the line transformers 620 to the calling station 174. The selection digit is then dialed and repeated by the relay 600 to set the switch 110 to direct the page to the desired speaker area.

The paged party answers the call by extending a connection from another station 174 through the switchboard 178 to the answer line 182, and a ringing signal is applied across the line 182. A second ring cut-off diode 620 bridged across the line 182 controls the switchboard 176 to remove the ringing signal and to connect the answering station 174 to the line 182. The negative potential applied to the upper conductor of the line 182 completes an operating circuit for a relay 610 so that this relay operates to open the contacts 611 and to close a pair of contacts 612. The opening of the contacts 611 releases relay 600 so that the common control circuit 102 is restored to a normal condition in the manner described above. The continuing open condition of the contacts 611 prevents a subsequent attempted seizure of the module 180 and the common control circuit 102 during the period in which this module is being used for communication between the paging line 178 and the page answering line 182. The closure of the contacts 612 connects the answering line 182 to the paging line 178 through a pair of coupling capacitors 631 and 632. Thus, the lines 178 and 182 are connected for voice communication. When the paging station and the page answering station are restored to normal conditions, the restoration of the page answering station opens the answering line 182 so that the relay 610 is released to close the contacts 611 and to open the contacts 612. This restores the module 180 to its normal condition.

The module 184 (FIG. 7) provides normal paging service over the line 178 and uses the second line 182 as a priority or busy override line that can obtain access to the module 184 even when this module has previously been placed in service over the normal paging line 178. The module 184 is connected to the common control unit 102 by the plug 108 which includes a terminal C to which a high negative potential of around 60 volts is connected. This high negative potential is supplied to a terminal 182c of the line 182 and is effective in the switchboard 176 to continuously mark this line as busy and prevent its seizure except by stations having a busy override control. Thus, access to the line 182 is restricted to the stations 174 having the busy override feature.

When a connection has been extended from a calling station 174 to the switchboard 176 requesting use of the paging system 100, a ringing tone is again applied to the paging line 178 which is shunted by a diode 750. The diode operates in the manner described above to control the switchboard 176 to remove the ringing signal and to cut through the calling line to the paging line 178. The negative potential applied to the upper conductor of the line 178 is forwarded through a pair of normally closed contacts 702, one primary winding 761 of a line transformer 760, and a pair of normally closed contacts 732 to one terminal of the operating winding of a relay 740. The other terminal of the winding of this relay is connected to ground at the terminal CG. This circuit operates the relay 740 to close a pair of contacts 741 and to open a pair of contacts 742. The operations of the contacts 741 and 742 seize the common control circuit 102 in the manner described above. However, the closure of the contacts 741 also forwards ground through a diode 756 and a pair of normally closed contacts 721 to operate a relay 710. In operating, the relay 710 opens a pair of contacts 712 and closes a pair of contacts 711.

The paging line 178 is then provided with dial pulses as the paging area selection digit is dialed, and this digit is repeated by the relay 740 to the common control circuit 102 so that the stepping switch 110 is set in the manner described above to select the desired one or group of the speakers 140a–c. The paging line 178 is connected to the primary windings 761 and 762 of the line transformer 760 through the normally closed contacts 702 and 704 and is, in turn, coupled to the terminals VL by the secondary winding 763 of this transformer. At the conclusion of the paging announcement, the module 184 is restored to a normal condition by interrupting the paging line 178 so that the relays 740 and 710 are sequentially released.

Assuming, however, that during the use of the module 184 by the paging line 178, another station 174 makes an attempt to use this module over the busy override line 182, the switchboard 176 again applies a ringing signal across the terminals 182a and 182b of the line 182 which is effective to forward bias a diode 751 so that the switchboard 176 removes the ringing signals and connects the second calling station 174 to the line 182. This results in the application of a negative potential to the terminal 182b which is forwarded through the contacts 711 closed by the prior operation of the relay 710 and a diode 755 to complete an operating circuit for a relay 730, the other terminal of the winding of which is connected to ground at the terminal CG. In operating, the relay 730 opens the contacts 732 and closes a pair of contacts 721.

The opening of the contacts 732 interrupts the above-described operating circuit for the relay 740 so that this relay releases to open the contacts 741 and to close the contacts 742. The opening of the contacts 741 and the closure of the contacts 742 restore the common control circuit 102 to a normal condition in the manner described above. In addition, the opening of the contacts 741 interrupts the operating circuit for the relay 710, but this relay does not release at this time because the capacitor shunted around the operating winding of this relay makes the relay slow-to-release. The closure of the contacts 742 together with the closure of the contacts 731 completes an operating circuit for a relay 720 extending through a diode 757 so that this relay operates. In operating, the relay 720 opens the contacts 721 and closes a plurality of contacts 722 and 723.

The opening of the contacts 721 interrupts an additional point in the operating circuit for the relay 710, and the closure of the contacts 722 prepares an additional operating circuit for the relay 720. The closure of the contact 723 completes an operating circuit for a relay 700 which operates to open the contacts 702, 704, and 705 and to close a plurality of contacts 701 and 703. The opening of the contacts 702 and 704 disconnects the primary windings 761 and 762 of the line transformer 760 from the paging line 178, and the closure of the contacts 703 connects the terminal 182a of the line 182 to the primary winding 762. The closure of the contacts 701 prepares a circuit for connecting the terminal 182b of the line 182 to the primary winding 761, but this circuit is interrupted at the open contacts 712. The opening of the contacts 705 opens an alternate circuit for connecting the terminal 182b to the primary winding 761.

At the end of the slow-to-release interval of the relay 710, this relay releases to open the contacts 711 and to close the contacts 712. The closure of the contacts 712 completes a circuit extending through the closed contacts 701 for connecting the terminal 182b of the line 182 to one terminal of the primary winding 761 of the line transformer 760. The opening of the contacts 711 interrupts the abovedescribed operating circuit for the relay 730 so that this relay releases to open the contacts 731 and closes the contacts 732. The closure of the contacts 732 completes an operating circuit for the relay 740 extending from negative battery at the terminal 182b over a circuit including the closed contacts 712 and 701, the primary winding 761, and the closed contacts 732. The relay 740 reoperates to open the contacts 742 and to close the contacts 741. This actuation of the contacts 741 and 742 causes the seizure of the common control circuit 102 in the manner described above. The closure of the contacts 741 also forwards ground through the diode 756 and the closed contacts 722 to provide a holding circuit for the relay 720, the first operating circuit for this relay being interrupted by the opening of the contacts 731 when the relay 730 releases.

The calling party using the busy override line 182 can now dial the digit designating the area in which the page is to be directed. The dial impulses applied to the line 182 operate the relay 740 to actuate the contacts 741 and 742 to repeat the dialed digits to the stepping switch 110 in the common control circuit 102. When the stepping switch 110 has been set, the line 182 is coupled to the selected speaker through the line transformer 760 in the same manner as the paging line 178. The release of the calling station 174 releases the relay 740 to close the contacts 742 and to open the contacts 741. This restores the common control circuit 102 to a normal condition in the manner described above. In addition, the opening of the contacts 741 interrupts the holding circuit for the relay 740 so that after its slow-to-release interval determined by its shunting capacitor, this relay releases to interrupt the operating circuit for the relay 700. This relay releases to restore the normal connection between the paging line 178 and the control module 184.

The module 186 for terminating a switch-through or "dry" line from the switchboard 188 is illustrated in FIG. 8 of the drawings. The module 186 is connected to the common control circuit 102 by the plug 108 and includes a line transformer 820 having a pair of primary windings 821 and 822 whose terminals are connected to the terminals of the line from the switchboard 188. The other terminal of the winding 821 is connected to negative battery through a line balancing impedance 800, and the other terminal of the winding 822 is connected to the winding of a relay 810. Thus, the module 186 functions in substantially the same manner as the module 162 to operate the relay 810 to close a pair of contacts 811 and to open a pair of contacts 812 when a connection is extended from a calling station 190 through the switchboard 188 to the module 186. The actuations of the contacts 811 and 812 seize the common control circuit 102 in the manner described above.

However, when the common control circuit 102 is seized and the relay 200 (FIG. 1) is operated to close the contacts 203, ground is forwarded from the terminal LG through a diode 840 to a control conductor in the line extending between the module 186 and the switchboard 188. The ground applied to this control conductor is used to hold the switch train extended to the module 186. The relay 810 can then be operated and released in accordance with the selection digit dialed at the calling station 190 so that the voice path extended to the module 186 is coupled through the secondary winding 823 of the line transformer 820 and the terminals VL to the selected speaker. When the calling station 190 returns to a normal condition, the line is opened to release the relay 810 and restore both the common control 102 and the module 186 to a normal condition.

The details of the module 136 for permitting any one of the calling stations to direct a page to one, a selected group, or all of the paging areas is illustrated in FIG. 9 of the drawings. The module 136 is connected to the common control circuit 102 by a plug 940 that is detachably connected to the output socket 280 of the common control circuit 102. When the plug 940 and socket 280 are connected, the ten contacts selectively engaged by the wiper 116 of the stepping switch 110 in the common control circuit 102 are interconnected by the like designated terminals in the units 280 and 940 identified as C1–C10. In addition, the paging output contacts 281 and 282 in the socket 280 are connected to the terminals 941 and 942 in the plug 940. The terminals 283 and 284 which receive the voice signals applied to the input of the paging amplifier 130 are connected to a pair of terminals 943 and 944 in the plug 940. As indicated above, the common control circuit 102 is conditioned for operation with the output module 136 by operating the switch 140 to close the contacts 141 and 143 and to open the contacts 142 and 144. This disconnects the output of the paging amplifier 130 from the wipers 114a and 114b and connects it to the terminals 281 and 282 to permit the output of the paging amplifier 130 to be extended to the module 136. In addition, the switch 150 is operated to close the contacts 151 so that a control ground is applied to the wiper 116. This ground is selectively forwarded to the control module 136 by the connected terminals C1–C10.

The module 136 includes a plurality of switching or connecting relays equal to the number of different speaker areas, such as those containing the speakers 104a–c, for instance. In the illustrative example, only three connecting relays 900, 910 and 920 are provided representing first, second, and ninth speaker areas. These relays are connected to plugs 905, 915 and 925, for instance, which are detachably connected to corresponding sockets 906, 916 and 926. Thus, the module 136 can be adapted to provide service to a varying number of speaker areas. The module 136 also includes an all-call connecting or transfer relay 930 connected to a plug 936 that is detachably received in a socket 937. The first, second and ninth speakers are assigned the selection digits "1," "2" and "9," respectively, and the all-call relay 930 is assigned the selection identification "0" represented by ten dial impulses.

In the normal condition of the module 136, program material from the source 148 is forwarded to the input of the program amplifier 144 through a pair of normally closed contacts 933 and 935 on the all-call relay 930 over the connection provided between the plug 936 and the socket 937. The output of the program amplifier is connected in parallel to all of the sockets 906, 916 and 926 and is forwarded by contacts on the associated transfer or connecting relays 900, 910 and 920 to all of the speakers 104a–c in all of the speaker areas. As an example, the output of the program amplifier 144 is forwarded through a group of normally closed contacts 902 and 904 on the area "1" relay 900 to the winding of the speaker 104a in the first speaker area.

Assuming that one of the calling stations shown in FIG. 1 desires a paging connection to only the first paging area, the stepping switch 110 is set to its first position in the manner described above so that the wiper 116 engages the contact C–1. The release of the relay 210 following the setting of the switch 110 (FIG. 2) closes the contacts 212 so that ground is applied by the wiper 116 to the contact C–1. This is forwarded over the terminals C–1 in the socket 280 and the plug 940 (FIG. 9) through the socket 906 and the plug 905 to the operating winding of the relay 900. In operating, the relay 900 closes a plurality of contacts 901 and 903 and opens the contacts 902 and 904. The opening of the contacts 902 and 904 disconnects the output of the program amplifier 144 from the selected speaker 104a although program material is supplied to the remaining paging areas. The closure of the contacts 901 and 903 connects the winding of the speaker 104a to the terminals 941 and 942 to which the output signals from the paging amplifier 130 are supplied. Thus, a voice communication path is extended from the calling station to the speaker 104a in the selected area. When the common control circuit 102 is restored to its normal condition, the stepping switch 110 is restored to its normal condition, and the operating circuit for the relay 900 is interrupted to release this relay. In releasing, the closure of the contacts 902 and 904 connects the speaker 104a to the output of the program amplifier 144, and the opening of the contacts 901 and 903 disconnects this speaker from the output of the paging amplifier 130.

Assuming that a calling station now desires to concurrently page in the second and ninth areas and that the selection digit "4" has been assigned to this function, the paging station seizes the common control circuit 102 and operates the switch 110 to its fourth position in which the wiper 116 applies ground to the contact C–4. This ground is forwarded over the socket 280 and the plug 940 to the terminal C–4 and is then forwarded to a matrix panel 950. The panel 950 includes a plurality of diodes, the anodes of which are connected to those terminals in the plug 940 that are assigned to selection digits representing more than a single area to be paged. The cathodes of the diodes are selectively strapped to the control leads for the transfer relays 900, 910 and 920, for instance. In the illustrative example, the terminal C–4 on the plug 940 is connected by a pair of diodes 951 and 952 to the control leads for the second and ninth area relays 910 and 920, respectively. These two relays are operated to disconnect the speakers 104b and 104c from the output of the program amplifier 144 and to connect them to the output of the paging amplifier 130. Thus, the paging announcement is concurrently directed to both of these areas. The module 136 and the common control circuit 102 are restored to a normal condition in the manner described above when the calling station is restored to its normal condition.

The module 136 also provides an all-call service in which any one of the stations served by the system 100 can concurrently transmit a paging announcement to all of the speaker or paging areas. In the illustrated system 100, the all-call function is assigned to the tenth or last position of the stepping switch 110. Accordingly, when a calling station seizes the common control circuit 102 and operates the stepping switch 110 to its tenth position, ground is applied to the terminal C–10 in the plug 940.

This ground is forwarded through the socket 927 and the plug 936 to complete an operating circuit for the relay 930 so that this relay operates to open the contacts 933 and 935 and to close a plurality of contacts 931, 932, and 934. The contacts 931 provide a set of contacts available for auxiliary control, such as muting the program source 148 or the paging amplifier 130. The opening of the contacts 933 and 935 disconnects the program source 148 from the input to the program amplifier 144, and the closure of the contacts 932 and 934 connects the terminals 943 and 944 on the plug 940 to the input of the program amplifier 144. As set forth above, the terminals 943 and 944 in the plug 940 receive voice signals directly from the incoming line, and the closed contacts 932 and 934 forward these signals to the input of the program amplifier 144. Since the output of this amplifier is connected to all of the speaker areas through the normally closed contacts, such as the contacts 902 and 904, on the relays 900, 910, and 920, all of the speaker areas receive the paging announcement. If it is necessary or desirable to provide additional stages of amplification, the contacts 932 and 934 can be connected to the terminals 941 and 942 to receive the output of the paging amplifier 130. With this arrangement, both the paging amplifier 130 and the program amplifier 144 are used.

At the termination of a paging operation, the common control circuit 102 is released, and the operating circuit for the all-call relay 930 is interrupted so that this relay releases to restore its contacts to their normal positions in which the paging information is disconnected from the program amplifier 144 and the program source 148 is connected thereto.

The common control circuit 102 can be provided with the emergency all-call module 156 (FIG. 10) to provide means for interrupting any paging announcement in process and for immediately conditioning the speakers 104a–c in all of the paging areas to receive an announcement. The emergency phone 154 (FIGS. 1 and 10) and the module 156 are connected to the common control circuit 102 by the detachable interconnection of the plug 158 (FIG. 10) and the socket 160 (FIG. 2) after previously removing the jumper 261 from the socket 160 (FIG. 2). Thus, the ground signal forwarded to the terminal CG instead of being supplied directly through the jumper is extended through a pair of normally closed contacts 1001 on a normally released relay 1000 in the module 156.

When an emergency paging announcement is to be made in all of the speaker areas, the station 154 is placed in a calling condition so that a circuit is completed extending from ground through the winding of the relay 1000, one primary winding 1021 of a line transformer 1020, the line to an through the calling station 154, a second primary winding 1022 on the line transformer 1020, and the winding of a relay 1010. This completes operating circuits for the two relays 1000 and 1010 so that these relays are operated to open the contacts 1001 and to close a pair of contacts 1011. The opening of the contacts 1001 removes the master ground from the common control circuit 102 so that any call in progress is released, and this circuit is disabled.

The closure of the contacts 1011 forwards ground to the tenth contact in the bank engaged by the wiper 116 and thus supplies ground to the operating winding of the all-call relay 930 in the module 136 (FIG. 9). The relay 930 operates to disconnect the program source 148 from the input of the program amplifier 144 and to connect this input to either of the sets of terminals 281, 282 or 283, 284. The secondary winding 1023 of the line transformer 1020 is connected directly to the terminals 283 and 284 or indirectly through the paging amplifier 130 to the terminals 281 and 282. Thus, the calling station 154 is now conditioned to transmit a paging announcement to all of the speaker areas. When the station 154 is returned to its normal condition, the relays 1000 and 1010 are released to close the contacts 1001 and to open the contacts 1011. The opening of the contacts 1011 releases the all-call relay 930 in the module 136, and the closure of the contacts 1001 returns master ground to the terminal CG in the common control circuit 102 to condition the system 100 for normal operation.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A dial controlled paging system comprising a plurality of speakers disposed in different areas, selector means for extending communication paths to the speakers, a plurality of stations including dialing devices, means controlled from a calling one of the stations for seizing the selector means and for operating the selector means in accordance with signals from the dialing device at the calling station to extend a communication path from the calling station to a selected one of the speakers, an additional station, and means responsive to the establishment of a calling condition at the additional station for releasing any other calling station and for operating the selector means to connect all of the speakers to the additional station.

2. The system set forth in claim 1 additionally comprising control means controlled by the operation of the selector means to one of its settings for connecting said calling one of said stations to all of the speakers in the absence of a calling condition at the additional station.

3. A dial controlled paging system comprising a plurality of spaced speakers, a plurality of paging stations each including a dialing device, selector means operable to a plurality of different settings, means for connecting the dialing device at a calling one of the paging stations to the selector means to permit the selector means to be operated to a selected one of its settings by the dialing device at the calling station, connecting means for each of the speakers for extending a voice communication path from a calling station to one of the speakers, a translating network connected between the selector means and the connecting means to operate different selected combinations of the connecting means in dependence on the setting of the selector means, an additional paging station, and means controlled by the additional station for releasing the selector means and for controlling the connecting means to connect all of the speakers to the additional station.

4. A paging system comprising a plurality of speakers disposed in different areas, a source of program material, connecting means normally connecting all of the speakers to the source of program material, a plurality of paging stations each having a dialing device for supplying dialing signals, selector means operable to different settings under the control of the dialing devices in the paging stations, means responsive to the establishment of a calling condition at one of the paging stations for rendering the selector means responsive to control by the dialing signals from the dialing device at the calling station to adjust the selector means to a setting representing a desired speaker, and means controlled by the selector means in dependence on the setting thereof for operating the connecting means to disconnect the source of program material from the desired speaker and to connect the desired speaker to the one of the paging stations that is in a calling condition.

5. A dial controlled paging system for use with input lines of different characteristics comprising a plurality of spaced speakers, central control means common to all of the speakers and including both speaker selecting means and signal responsive means for controlling the operation of the selecting means, an input line module including both a line terminating means terminating the input line and a signal generating means, said signal generating means including relay means having a winding connected at one side to the line terminating means, a source of reference potential in the central control means, and detachable connector means interposed between the input line module and central control means connecting the other side of the relay winding to the reference potential and the signal generating means to the signal responsive means.

6. A dial controlled paging system for use with input lines of different characteristics comprising a plurality of spaced speakers, central control means common to all of the speakers and including both selecting means for selecting a communication path to desired speakers and signal responsive means for controlling the operation of the selecting means, an input line module including both a line terminating means terminating the input line and a signal generating means, said signal generating means including relay means having a winding connected at one side to the line terminating means, a source of reference potential in the central control means, and detachable connector means interposed between the input line module and central control means connecting the other side of the relay winding to the reference potential and the signal generating means to the signal responsive means, said connector means also including means for coupling the terminated line to the selected communication path.

7. A dial controlled paging system comprising an input line providing dial and voice signals, a plurality of spaced speakers, central control means common to all of the speakers and including signal responsive speaker selecting means for selectively extending a communication path to a desired speaker, an input line module including both a line terminating means terminating the input line and signal generating means controlled by the dial signals, said signal generating means including relay means having a winding connected at one side to the line terminating means, a source of reference potential in the central control means connected to the other side of the relay winding in the module, means connecting the signal generating means to the speaker selecting means and voice signals from the terminated line to the selected communication path, an additional input line, and means controlled from the additional line for disconnecting the reference potential from the relay winding to disable the input line module.

8. A dial controlled paging system for use with a plurality of different input lines comprising a plurality of spaced speakers, a central control means including selecting means for extending a communication path to a selected speaker, pulse responsive means in the central control means for controlling the operation of the selecting means, first connecting means for extending a communication channel to the selecting means and a signalling path to the pulse responsive means, and a module unit including a line terminating means for terminating a selected one of the different input lines and a pulse generating means controllable from the terminated line, said module unit including second connecting means detachably connected to the first connecting means and connecting the pulse generating means in the module unit to the signalling path and the line terminating means to the communication channel, said input line being adapted to provide a ringing signal, and said module unit including unidirectional conducting means in the line terminating means for controlling the application of the ringing signal to the line terminating means.

References Cited by the Examiner

UNITED STATES PATENTS

| | | | |
|---|---|---|---|
| 2,571,250 | 10/1951 | Jones | 179—18 |
| 2,684,406 | 7/1954 | Lomax et al. | 179—18 |
| 2,717,925 | 9/1955 | Lomax | 179—18 |
| 2,722,566 | 11/1955 | Peterson | 179—18 |
| 2,848,550 | 8/1958 | Pharis | 179—18 |
| 2,913,533 | 11/1959 | Gatzert | 179—18 |
| 3,003,038 | 10/1961 | Baker et al. | 179—17 |
| 3,099,719 | 7/1963 | Gerbore et al. | 179—27 |

KATHLEEN H. CLAFFY, *Primary Examiner.*

ROBERT H. ROSE, *Examiner.*

H. BOOHER, H. ZELLER, *Assistant Examiners.*

UNITED STATES PATENT OFFICE
CERTIFICATE OF CORRECTION

Patent No. 3,267,219                            August 16, 1966

John H. Van Horn

It is hereby certified that error appears in the above numbered patent requiring correction and that the said Letters Patent should read as corrected below.

Column 7, line 51, strike out "and the relay 210, and the closure of the contacts" and insert instead -- is operated, the interrupted contacts 111 are --; column 11, line 65, for "abovedescribed" read -- above-described --; column 15, line 13, for "an" read -- and --.

Signed and sealed this 22nd day of August 1967.

(SEAL)
Attest:

ERNEST W. SWIDER                          EDWARD J. BRENNER
Attesting Officer                             Commissioner of Patents